No. 868,256. PATENTED OCT. 15, 1907.
C. E. DUNN.
MACHINE FOR REDUCING PEAT TURF INTO HALF STUFF.
APPLICATION FILED MAR. 28, 1907.

2 SHEETS—SHEET 1.

Witnesses:
Chas. D. King
Adolph G...

Inventor:
Clifford E. Dunn
by Dunn ... & Clarke
Attys

No. 868,256. PATENTED OCT. 15, 1907.
C. E. DUNN.
MACHINE FOR REDUCING PEAT TURF INTO HALF STUFF.
APPLICATION FILED MAR. 28, 1907.

2 SHEETS—SHEET 2.

Witnesses:
Chas. D. King
Aaagh Dince

Inventor:
Clifford E. Dunn
by Dunn Fink & Clarke
Attys

UNITED STATES PATENT OFFICE.

CLIFFORD E. DUNN, OF NEW YORK, N. Y., ASSIGNOR TO EDWARD P. METCALF, OF PROVIDENCE, RHODE ISLAND, ADOLPH LOEWENTHAL, OF NEW YORK, N. Y., AND CLIFFORD E. DUNN, OF BROOKLYN, NEW YORK, TRUSTEES.

MACHINE FOR REDUCING PEAT TURF INTO HALF STUFF.

No. 868,256.

Specification of Letters Patent.

Patented Oct. 15, 1907.

Application filed March 28, 1907. Serial No. 365,139.

*To all whom it may concern:*

Be it known that I, CLIFFORD E. DUNN, a citizen of the United States, residing in the city of New York, borough of Brooklyn, county of Kings, and State of New York, have invented certain new and useful Improvements in Machines for Reducing Peat Turf into Half Stuff, of which the following is a full, clear, and exact specification.

My invention relates to machines for the treatment of peat turf, whereby it is reduced into half stuff suitable for the use of paper board or paper manufacturers, and particularly to that type of machine wherein the peat turf is spread upon a bed-plate and there subjected to the impact and effect of reciprocating stampers, and my invention consists in an improved construction of such machine, whereby the stampers are alternately raised and released so as freely to descend in a direction whereby the operating surfaces will be extremely efficient, and the surface of the peat turf will be uniformly reduced.

Figures 1, 3:
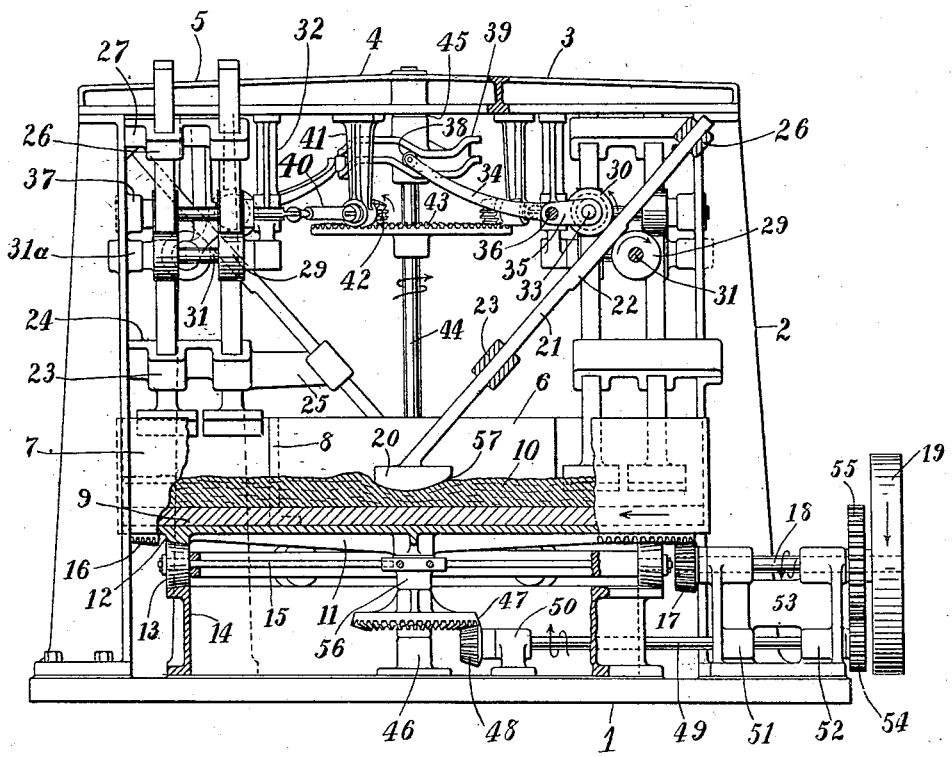
Figure 2:
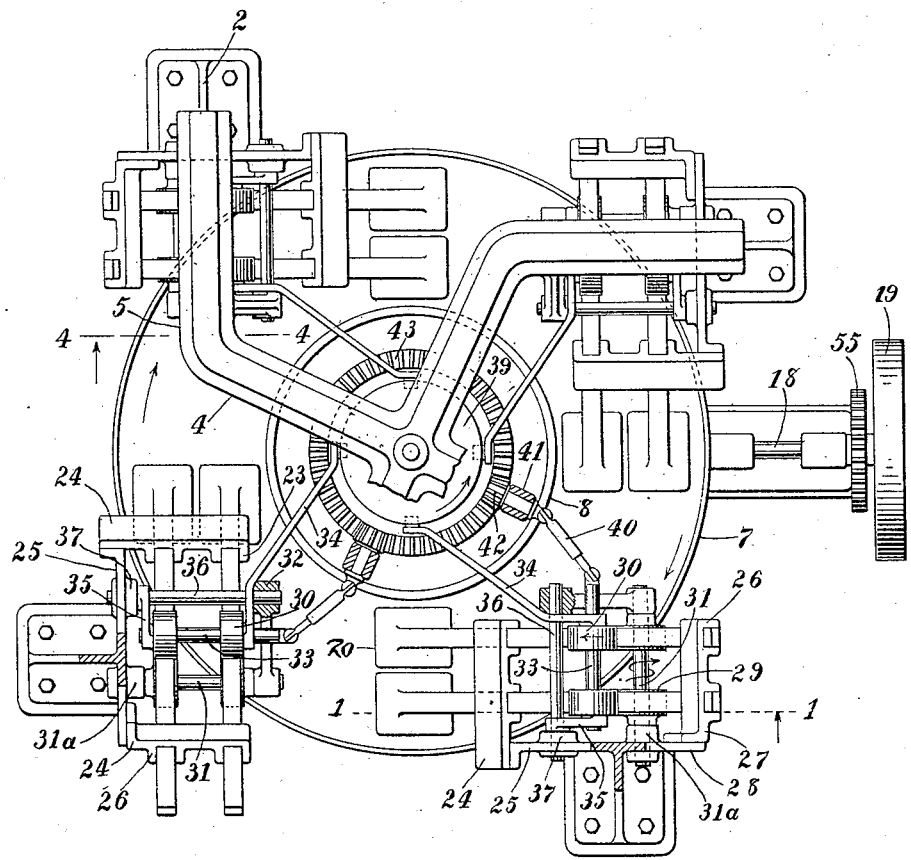
Figure 4:
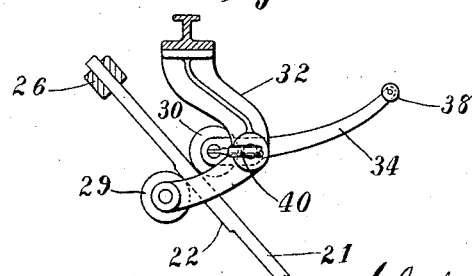

My invention likewise relates to certain details of construction hereinafter described and fully pointed out in the accompanying drawings, wherein Figure 1 is an elevation, partly in section, of my improved machine, Fig. 2 is a plan thereof, part being broken away for clearness of illustration; Fig. 3 is a development of the cam groove showing the course of the cam rollers; and Fig. 4 is a detail of the suspending and operating devices for the stamping shaft operating rollers.

My machine is equipped with a bed-plate 1, and with upright standards 2, of which I have shown four, which are firmly attached to the bed-plate, as by bolts. These standards are at their upper ends united by a frame 3, which has four arms projecting therefrom, which arms, for about one-half their length, radiate as at 4, and are then bent at an obtuse angle, terminating in straight portions 5.

An annular trough or peat turf carrier 6 is provided with outer walls 7 and inner walls 8, and with a bed-plate 9, which is preferably formed of some rigid material, such as stone or iron, and upon which is uniformly spread a layer of peat turf 10. The carrier 6 likewise has a floor 11, which is provided with stiffening braces, and an outer annular rib or track 12, by means of which the carrier is supported and rotated upon traveling rollers or wheels 13, which, in turn, revolve upon the upper flange of an annular ring or web 14, which is mounted upon the bed-plate 1. These rollers 13 are maintained in proper position by axles 15, upon which they are journaled so as to freely revolve. The carrier 6 is revolved through a toothed ring 16, fixed upon the floor 11 at its outer circumference, which in turn is engaged by a beveled pinion 17, fixed upon main driving shaft 18, which carries driving pulley 19, and is supported in bearings in frame 53. Stampers 20 are provided with shafts 21, rectangular in cross-section, and having thickened portions at 22, and which are guided in lower rectangular bearings 23 formed in lower bearing arms 24, which arms at their outer ends are attached to brackets 25, projecting from standards 2. Rectangular bearings 26 for the support of the stamper shafts at their upper ends are formed in bearing arms 27, which are attached to brackets 28, projecting from the opposite side of standards 2 from 25. By means of such rectangular bearings the stamper shafts are supported and guided in their reciprocations and prevented from turning. The stamper shafts 21 are inclined at an angle of approximately 45 degrees in the direction of the movement of the carrier, and to accomplish this the lower bearings 23 are in different vertical planes than the upper bearings 26.

The stampers and stamper shafts are raised by means of friction rollers 29, 30, of which there is one pair for each shaft. Lower friction rollers 29 are mounted upon shafts 31, supported at one end in bearings 31 in the standards 2, and at the other end in bearings in shaft hangers 32, which depend from the outer portion 5 of the upper frame 3. Upper rollers 30 are mounted upon shafts 33, which are mounted upon the forward ends of rocking cam-actuated levers 34 and arms 35, both of which are fixed upon rock shafts 36, which are mounted to rock in bearings in layer 32 and in bearings 37 upon the upright standard 2. The inner ends of levers 34 carry rollers 38, which enter and travel in a peripheral groove formed in cam wheel 39.

Rollers 29 are idlers and the lifting of the stamper shafts 21 is effectuated by the pressure of upper roller 30 upon the surface of the said shaft and the revolution of said rollers, and I will now describe the means whereby said upper rollers 30 are revolved. This is clearly shown in Fig. 2 and in Fig. 4, which latter figure is a detail view taken from within the machine looking outward on the line 4—4 of Fig. 2. Shafts 33, upon which the upper rollers 30 are mounted, are extended inward from the said rollers, and are connected to shafts 40 by universal joint connections, and said shafts 40 contain second universal joints near their inner ends, inside of which they are supported by bearings in hangers 41, which depend from inner arms 4 of frame 3. Upon the inner end of said shafts 40 are fixed bevel gears 42, which engage the teeth of a larger beveled gear 43, and by means of this the said shafts 40 and upper rollers 30 are rotated.

Cam wheel 39 and beveled pinion 43 are both fixed upon the main shaft 44, which is mounted in bearings 45 in the upper frame 3, and 46 in bed-plate 1. This main shaft is driven by a beveled gear 47 at its lower end, through beveled pinion 48 mounted upon a shaft 49, which is supported in bearings 50 mounted upon the bed-plate 1, and bearings 51, 52, in a frame 53, which is mounted upon bed-plate 1 outside of the frame. At the outer end of shaft 49 is a pinion 54 meshing with gear wheel 55, mounted upon driving shaft 18. The axles 15 which carry the rollers 13 for the peat carrier radiate from a hub 56 loosely carried by main shaft 44.

The operation of my machine will be readily understood from the foregoing description. The main driving pulley 19 revolving in the direction of the arrow upon its outer face, will cause the peat carrier 6 to be moved in the direction indicated by the arrow in Fig. 1. During this motion the counter-shaft 49 and main shaft 44 will revolve as indicated by the arrow in Fig. 1, whereupon beveled pinions 42 and connected upper rollers 30 will be revolved in the direction indicated by the arrows in Fig. 1, and when the cam roller 38 has ridden up the incline to the top of the cam groove in wheel 39, the upper rollers 30 will be pressed hard upon the thickened portion 22 of stamper shaft 21, and lower rollers 29 then revolving idly, will permit the revolution of upper rollers 30 to lift the said stamper shaft and stamper out of contact with the peat turf. In Fig. 1 the stampers at the right in the foreground are shown at the beginning of this lifting movement. When the stamper shafts shall have been lifted so far that the thickened portions 22 thereof shall have passed without the grip of rollers 29 and 30, the said shafts will remain in such position with both rollers revolving idly until cam rollers 38 will ride down the groove in cam wheel 39, whereupon upper rollers 30 will be lifted and permit the free and rapid descent of the stamper shafts and connected stampers. The stampers at the left of said figure, in the foreground, are shown as in their upper or lifted position.

I have shown the stampers provided with an operating face convex in the direction of the movement of the peat turf, and having a slightly greater degree of convexity at the rear portion 57, where the peat turf rides under the stamper. It will be observed that the cam rollers 38 have a perceptible dwell upon the lower portion of the groove in cam wheel 39, thereby permitting the stampers 20 to remain some time in contact with the peat turf. During this period of dwell the peat turf will be moving in the direction indicated by the arrow on carrier 6 in Fig. 1, and stampers 20 will then exercise a rubbing, drawing, or massaging action upon the bed of peat turf which is contained between the stampers and the rigid bed-plate 9.

It is obvious that the embodiment of my invention described and shown in the foregoing descriptions and drawings is but one typical form thereof, and that many modifications and changes may be made therefrom without departing from the spirit of my invention, and I do not mean to limit myself to the specific form described, but

What I claim and desire to secure by Letters Patent is:

1. In a peat-turf stamping machine, a carrier, a reciprocating stamper arranged in operative relation thereto, and means for reciprocating said stamper in a plane inclined relative to the surface of the carrier, and means for causing the stamper to engage different portions of the surface of the peat turf, substantially as described.

2. In a peat turf stamping machine a traveling carrier, a reciprocating stamper, and means for reciprocating said stamper in a plane inclined relative to the horizontal plane of the carrier, means for moving the carrier, and means for reciprocating the stamper, substantially as described.

3. In a peat-turf stamping machine a carrier, a plurality of stampers and means for reciprocating said stampers in substantially parallel planes inclined relative to the plane of the peat-receiving surface of said carrier and means for causing the stampers to engage different portions of the surface of the peat turf, whereby the entire body of the peat turf will be subjected to the action of the stampers, substantially as described.

4. In a peat-turf stamping machine a traveling carrier, a plurality of reciprocating stampers and means for reciprocating said stampers in a plane inclined relative to the plane of the peat-receiving surface of said carrier, means for moving the carrier and means for reciprocating the stamper, whereby the entire surface of the peat turf will be subjected to the action of the stampers, substantially as described.

5. In a peat-turf stamping machine a carrier, a reciprocating stamper arranged in operative relation thereto, and means for reciprocating said stamper in a plane inclined relative to the plane of the peat receiving surface of the carrier, means for permitting the stamper to dwell upon the peat turf between reciprocations, whereby a rubbing or massaging effect is produced, and means for causing the stamper to engage different portions of the surface of the peat turf, substantially as described.

6. In a peat-turf stamping machine a traveling carrier, a plurality of reciprocating stampers and means for reciprocating said stampers in a plane inclined relative to the plane of the peat-receiving surface of said carrier, means for moving the carrier and means for reciprocating the stamper, whereby the entire surface of the peat turf will be subjected to the action of the stampers, means for permitting the stampers to dwell upon the peat turf between reciprocations, whereby a rubbing or massaging effect is produced, substantially as described.

7. In a peat-turf stamping machine, a revolving carrier, a series of stampers uniformly disposed in operative relation thereto, a shaft for each stamper inclined relative thereto, a plurality of bearings for each shaft situated in different vertical planes, and means for raising said shafts and suddenly releasing same, substantially as described.

8. In a peat-turf stamping machine, a revolving carrier, a series of stampers disposed in radial pairs, each pair covering substantially the entire width of the carrier, a shaft for each stamper inclined relative thereto, a plurality of bearings for each shaft situated in different vertical planes, and means for raising said shafts and suddenly releasing same, substantially as described.

9. In a peat-turf stamping machine a revolving carrier, a series of stampers uniformly disposed in operative relation thereto, a shaft for each stamper inclined relative thereto, a plurality of bearings for each shaft situated in different vertical planes, the said shaft and bearings rectangular in cross-section, and means for raising said shafts and suddenly releasing same, substantially as described.

10. In a peat-turf stamping machine, a revolving carrier, a series of stampers uniformly disposed in operative relation thereto, a shaft for each stamper, bearings for said shaft, rollers on each side of said shaft, means for revolving one of said rollers, and means for causing said roller to approach and recede from said shaft, whereby, as the roller engages said shaft, it will cause the stamper to be lifted, substantially as described.

11. In a peat turf stamping machine, a revolving carrier, a series of stampers uniformly disposed in operative relation thereto, a shaft for each stamper inclined relative thereto, a plurality of bearings for each shaft situated in different vertical planes, and means for raising said shafts and suddenly releasing same, and means for permitting said stampers to dwell a substantial interval upon the surface of the peat turf, substantially as described.

12. In a peat-turf stamping machine a revolving carrier, a series of stampers uniformly disposed in operative relation thereto, a shaft for each stamper, bearings for said shaft, rollers on each side of said shaft, means for revolving one of said rollers, and means for causing said roller to approach and recede from said shaft, whereby as the roller engages said shaft it will cause the stamper to be lifted, and means for permitting said stampers to dwell a substantial interval upon the surface of the peat turf, substantially as described.

13. In a peat-turf stamping machine a revolving carrier, a series of stampers uniformly disposed in operative relation thereto, a shaft for each stamper, bearings for said shaft, a thickened part of said shaft, rollers on each side of said shaft adjacent to said thickened part, means for revolving one of said rollers, and means for causing said roller to approach and recede from said shaft, whereby, as the roller engages said shaft, it will cause the stamper to be lifted, substantially as described.

14. In a peat-turf stamping machine, a carrier, a stamper disposed in operative relation thereto, a stamper shaft, bearings therefor, a pair of rollers disposed on opposite sides thereof, a fixed shaft for one of said rollers, a rocking shaft for the other roller, a cam-actuated lever for rocking said shaft, a main shaft, a cam thereon, a flexible shaft attached to said rocking shaft, a pinion thereon, and a gear on the main shaft meshing therewith, substantially as described.

15. In a peat-turf stamping machine, a carrier, a stamper disposed in operative relation thereto, a stamper shaft, bearings therefor, a pair of rollers disposed on opposite sides thereof, a fixed shaft for one of said rollers, a rocking shaft for the other roller, a cam-actuated lever for rocking said shaft, a main shaft, a cam thereon so constructed as to permit said stamper to remain a substantial time in contact with said peat turf, a flexible shaft attached to said rocking shaft, a pinion thereon, a gear on the main shaft meshing therewith, and a gear and pinion for revolving said carrier, substantially as described.

16. In a peat-turf stamping machine a revolving carrier, a bed-plate therein, a track therefor, a gear and pinion for revolving same, a plurality of reciprocating stampers, shafts therefor, disposed at such an angle that the stampers are dropped in the direction of movement of the carrier, bearings for said shafts, rollers for said reciprocating shafts, a fixed shaft for one of said rollers, a rocking shaft for the other, a cam-actuated lever for rocking said shaft, a main shaft, a cam wheel thereon for actuating said lever, a flexible shaft for driving said rocking shaft, a driving pinion on said flexible shaft, a gear on the main shaft for driving same, substantially as described.

17. In a peat-turf stamping machine, a revolving carrier, a bed-plate therein, a plurality of reciprocating stampers disposed in radial pairs over said carrier, shafts therefor, disposed at an angle whereby the stampers are dropped toward the direction of movement of the carrier, bearings for said shafts, said shafts and bearings rectangular in cross-section, rollers for reciprocating said shafts, a fixed bearing for one of said rollers, a rocking shaft for the other, a rocking lever for rocking said shaft, a vertical main shaft, a wheel thereon having a peripheral cam groove for operating said rocking cam, adapted to permit a dwell of said stamper on the peat turf, a flexible shaft for driving said rocking shaft, a gear and pinion for driving said flexible shaft from the main shaft, substantially as described.

In testimony whereof, I have hereunto set my hand in the presence of two subscribing witnesses.

CLIFFORD E. DUNN.

Witnesses:
ADOLPH F. DINSE,
CHARLES A. SCHEUBER.